(12) United States Patent
Park et al.

(10) Patent No.: US 8,791,908 B2
(45) Date of Patent: Jul. 29, 2014

(54) TOUCH PANEL AND ELECTRONIC DEVICE INCLUDING THE SAME

(75) Inventors: Sunghyuk Park, Yongin-si (KR); Seong-Taek Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 12/849,310

(22) Filed: Aug. 3, 2010

(65) Prior Publication Data

US 2011/0163978 A1    Jul. 7, 2011

(30) Foreign Application Priority Data

Jan. 7, 2010  (KR) .......................... 10-2010-0001443

(51) Int. Cl.
*G06F 3/041* (2006.01)
*G09G 5/00* (2006.01)

(52) U.S. Cl.
USPC .......................................... 345/173; 345/156

(58) Field of Classification Search
USPC ........................... 345/163, 173, 178; 701/208
See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,067,756 B2 | 6/2006 | Cok | |
| 7,131,073 B2 | 10/2006 | Rosenberg et al. | |
| 7,196,688 B2 | 3/2007 | Schena | |
| 7,202,837 B2 | 4/2007 | Ihara | |
| 7,268,770 B1 | 9/2007 | Takahata et al. | |

(Continued)

FOREIGN PATENT DOCUMENTS

| | | |
|---|---|---|
| CN | 1829951 A | 6/2006 |
| EP | 2 026 178 A1 | 2/2009 |

(Continued)

OTHER PUBLICATIONS

Extended European search report dated Oct. 7, 2010 issued by the European Patent Office in counterpart European Application No. 10166013.2 of co-pending U.S. Appl. No. 12/780,996.

(Continued)

*Primary Examiner* — Michael Faragalla
(74) *Attorney, Agent, or Firm* — Sughrue Mion, PLLC

(57) ABSTRACT

A touch panel and an electronic device including the same are provided. The touch panel includes a first substrate, a second substrate, an electro-rheological fluid, a sensor, and a controller. The second substrate is spaced apart from the first substrate by a gap and includes a touch surface. The electro-rheological fluid is filled in a gap between the first substrate and the second substrate. The sensor senses an input on the touch surface and determines an input location at which the input occurs, and the controller varies a viscosity of the electro-rheological fluid in a location corresponding to a peripheral region of the input location.

19 Claims, 18 Drawing Sheets

(56) References Cited

U.S. PATENT DOCUMENTS

| | | |
|---|---|---|
| 7,339,572 B2 | 3/2008 | Schena |
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,581,866 B2 | 11/2013 | Park et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1* | 4/2007 | Maruyama et al. ........... 345/173 |
| 2007/0152974 A1 | 7/2007 | Kim et al. |
| 2007/0152982 A1 | 7/2007 | Kim et al. |
| 2007/0182718 A1 | 8/2007 | Schoener et al. |
| 2007/0211032 A1* | 9/2007 | Ahn et al. ................. 345/163 |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich et al. |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1* | 7/2009 | Fyke et al. ................. 701/208 |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026655 A1 | 2/2010 | Harley |
| 2010/0059295 A1 | 3/2010 | Hotelling et al. |
| 2010/0060610 A1 | 3/2010 | Wu |
| 2010/0149108 A1 | 6/2010 | Hotelling et al. |
| 2010/0156829 A1 | 6/2010 | Shimodaira |
| 2010/0214232 A1 | 8/2010 | Chan et al. |
| 2010/0259485 A1 | 10/2010 | Chuang |
| 2010/0321330 A1 | 12/2010 | Lim et al. |
| 2010/0321335 A1 | 12/2010 | Lim et al. |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| JP | 6-34940 A | 2/1994 |
| JP | 09-319509 A | 12/1997 |
| JP | 9-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-342035 A | 11/2002 |
| JP | 2004-71765 A | 3/2004 |
| JP | 2005-107804 A | 4/2005 |
| JP | 2005-135876 A | 5/2005 |
| JP | 2005-275632 A | 10/2005 |
| JP | 2006-11646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-079882 A | 4/2010 |
| JP | 2010-108505 A | 5/2010 |
| JP | 2011-3177 A | 1/2011 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |

OTHER PUBLICATIONS

European Communication, dated Mar. 19, 2013, issued in European Application No. 11150285.2.

Non-Final US Office Action, dated May 7, 2013, issued in U.S. Appl. No. 12/719,281.

Non-Final US Office Action, dated Mar. 15, 2013, issued in U.S. Appl. No. 12/889,800.

Final US Office Action, dated Mar. 27, 2013, issued in U.S. Appl. No. 12/948,479.

Non-Final US Office Action, dated Oct. 15, 2012, issued in U.S. Appl. No. 12/948,479.

Non-Final US Office Action, dated Feb. 1, 2013, issued in U.S. Appl. No. 13/103,221.

Non-Final US Office Action, dated Apr. 22, 2013, issued in U.S. Appl. No. 13/050,550.

Non-Final US Election Requirement, dated Apr. 10, 2013, issued in U.S. Appl. No. 13/097,937.

(56) References Cited

OTHER PUBLICATIONS

Chinese Office Action, dated Oct. 10, 2013, Application No. 201010200349.1.
U.S. Final Office Action dated Dec. 5, 2013, Issued in U.S. Appl. No. 13/050,550.
U.S. Non-Final Office Action dated Dec. 6, 2013 issued in U.S. Appl. No. 13/190,120.
U.S. Non-Final Office Action dated Jun. 20, 2013 issued in U.S. Appl. No. 12/780,996.
U.S. Non-Final Office Action dated Jul. 17, 2013, issued in U.S. Appl. No. 13/097,937.
U.S. Non-Final Office Action dated Aug. 12, 2013 issued in U.S. Appl. No. 13/224,422.
U.S. Non-Final Office Action dated Aug. 16, 2013, issued in U.S. Appl. No. 12/889,800.
Notice of Allowance, dated Oct. 25, 2013, issued in U.S. Appl. No. 12/780,996.
Notice of Allowance, dated Sep. 19, 2013, issued in U.S. Appl. No. 12/719,281.
Notice of Allowance, dated Jan. 22, 2014, issued by the USPTO in related U.S. Appl. No. 12/780,996.
Non-Final Office Action, dated Feb. 10, 2014, issued by the USPTO in related U.S. Appl. No. 12/719,281.
Communication, dated Mar. 4, 2014, issued by the Japanese Patent Office in counterpart Japanese Patent Application No. 2010-133879.
Final US Office Action, dated Apr. 3, 2014, issued in related U.S. Appl. No. 12/889,800.
Final US Office Action, dated Mar. 7, 2014, issued in related U.S. Appl. No. 13/097,937.
Non-Final US Office Action, dated Mar. 7, 2014, issued in related U.S. Appl. No. 13/224,422.

\* cited by examiner

TOUCH PANEL AND ELECTRONIC DEVICE INCLUDING THE SAME

CROSS-REFERENCE TO RELATED APPLICATION

This application claims priority from Korean Patent Application No. 10-2010-1443, filed on Jan. 7, 2010, the entire disclosure of which is herein incorporated by reference for all purposes.

BACKGROUND

1. Field

Apparatuses and devices consistent with the following description relate to a user input device, and more particularly, to a touch panel and an electronic device including the same.

2. Description of the Related Art

A touch panel is one example of an user input device used to determine an input signal from a user and a position on a touch panel by sensing contact by the user thereon. A user may input data or signals to a touch panel by contacting or pressing the touch panel with his or her finger, a stylus pen or the like. Recently, a touch panel has been developed which can process continuous inputs or multi-touch inputs, such as a flick, a drag, a scroll, a pinch, a tap-and-slide and so on, wherein the terms continuous input and multi-touch input denote an input that is conducted when a user continually contacts or presses a user touch surface of the touch panel.

A touch panel may be implemented as a touch pad which is used as a substitute for a mouse for a laptop computer, a netbook and the like, or the touch panel may substitute for an input switch of an electronic device. Also, the touch panel may be used in association with a display. A touch panel which is mounted on the screen of a display, such as Liquid Crystal Display (LCD), Plasma Display Panel (PDP), Cathode Ray Tube (CRT) and the like, is called a "touch screen". A touch panel may be integrated with a display to configure the screen of the display or may be attached additionally on the screen of the display.

The touch panel can be substituted for a user input device such as a keyboard and allow simple manipulations. Moreover, the touch panel can provide users with various types of buttons according to the types of applications to be executed or stages of the executed application. Accordingly, a touch panel, specifically, a touch screen, has been widely used as an input device for electronic equipment, such as a mobile phone, a Personal Digital Assistant (PDA), a Portable Multimedia Player (PMP), a digital camera, a portable games, an MP3 player, etc., as well as an Automated Teller Machine (ATM), an information trader, a ticket vending machine, etc.

A touch panel can be classified into a resistive type, a capacitive type, a saw type, an infrared type, etc., according to the methods of sensing an input of the user. A capacitive type touch panel determines whether a user presses the touch panel and the position of the user's press by measuring variations in capacitance due to contact or pressure. However, the capacitive type touch panel does not provide a user with a sense of input, that is, a feeling of recognition that a user gets upon inputting. In order to overcome this disadvantage, a method of installing a vibration motor below a touch panel has been proposed. The method offers users a sense of input by vibrating the whole touch panel using the vibration motor when a press by the user is sensed. However, the method fails to offer a sense of input when a continuous input, such as a multi-touch input, is sensed, and also users cannot check if the continuous input is being processed correctly unless they continue to watch the touch screen or display.

SUMMARY

One or more embodiments relate to a touch panel that allows a user to experience, when conducting a continuous input, a sense of input through his or her tactile sensation, and an electronic device including the touch panel.

One or more embodiments also relate to a touch panel that allows a user to recognize, when conducting a continuous input, a location at which the continuous input operation has to be terminated, or an existence of any objects or any window border on a traveling path of the continuous input through his or her tactile sensation, and an electronic device including the touch panel.

According to an aspect of an embodiment, there is provided a touch panel that includes a first substrate, a second substrate, an electro-rheological fluid, a sensor, and a controller. The second substrate is spaced apart from the first substrate by a gap and includes a touch surface. The electro-rheological fluid is filled in a gap between the first substrate and the second substrate. The sensor senses an input on the touch surface and determines an input location at which the input occurs, and the controller varies a viscosity of the electro-rheological fluid in a location corresponding to a peripheral region of the input location.

According to an aspect of an embodiment, there is provided a touch panel including a first substrate, a second substrate, a plurality of driving electrodes, an electro-rheological fluid, and a controller. The second substrate is spaced a apart from the first substrate by a gap, the second substrate comprising a touch surface. The plurality of driving electrode arrays include driving electrodes that are arranged on the first substrate and the second substrate such that the driving electrodes form driving electrode pairs, each of the driving electrode pairs including a driving electrode on the first substrate and a corresponding driving electrode on the second substrate and each of the driving electrode pairs is configured to induce an electrical field locally between the first substrate and the second substrate upon application of a driving voltage. The electro-rheological fluid is filled in the gap between the first substrate and the second substrate, and a viscosity of the electro-rheological fluid is changed by an electrical field induced by the driving electrode pairs. The controller applies, when a continuous input from a user is sensed on the touch surface, a driving voltage pattern to driving electrode pairs in a location corresponding to at least one peripheral region of a latest input location among locations at which the continuous input is sensed.

According to an aspect of an embodiment, there is provided an electronic device that includes a touch panel according to one of the touch panels described above.

BRIEF DESCRIPTION OF THE DRAWINGS

The above and/or other aspects will be more apparent from the following detailed description taken with reference to the accompanying drawings, in which.

DETAILED DESCRIPTION

Figure 1:
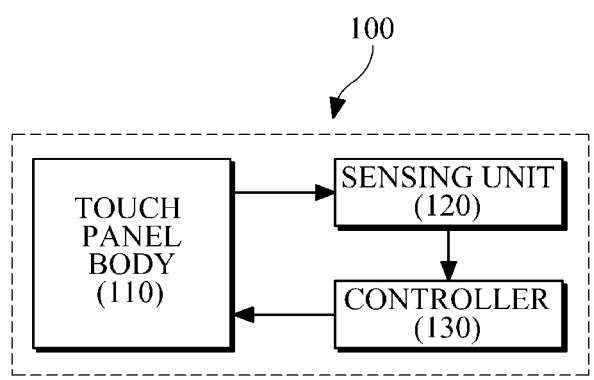
FIG. 1 is a block diagram of an exemplary touch panel.

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Throughout the drawings and the detailed description, unless otherwise described, the same drawing reference numerals will be understood to refer to the same elements, features, and structures. The relative size and depiction of these elements may be exaggerated for clarity, illustration, and convenience.

A touch panel according to embodiments that will be described below is a kind of user input device for electronic equipment to execute an instruction by sensing a continuous contact or pressure from a user on a user touch surface. The instruction may be predetermined. That is, a user may input a desired instruction to electronic equipment with a touch panel by continuing to contact or press a user touch surface of the touch panel. Such a continuous input or a multi-touch input denotes that an input location (that is, a location on the user touch surface which the user contacts) continues to move while the input is maintained. That is, a continuous input is an input of which the location moves along a path for a certain time interval, and the continuous input is different from inputs generated by repeatedly tapping a certain area on a touch panel, continuing to contact or press a certain area on a touch panel for a predetermined time period, or discontinuously contacting or pressing a certain area on a touch panel, etc. The path may be predetermined, and the certain time may also be predetermined. Also, it will be apparent to those skilled in the art that the traveling paths, distances and velocities of continuous inputs, what instructions such continuous inputs function as, etc. are not concerned with the current embodiments and do not limit the embodiments.

A touch panel may be mounted as a user input device onto various kinds of electronic devices. Specifically, a touch panel may be utilized as an input device for home/office appliances, as well as a touch pad for a notebook, a netbook or the like. Also, a touch panel may be implemented as a touch screen that is mounted onto a display of an electronic device. For example, the touch panel may be implemented as a touch screen of an electronic device, such as a mobile phone, a personal data assistant (PDA), a portable media player (PMP), an E-book terminal, a portable computer, a Automated Teller Machine (ATM), an information searcher, a ticket vending machine, etc.

A touch panel according to an exemplary embodiment provides a user who conducts a continuous input with a tactile sensation against a contact surface. That is, a user who moves an input location while contacting or pressing a touch panel may feel tactile variations against the contact surface of the touch panel along with the movement of the input location. For example, a user may feel, when moving an input location on a touch panel, tactile variations by sensing an increase or decrease in rigidity of the screen against the contact surface of the touch panel. In the current embodiment, a touch panel is utilized having Electro-Rheological (ER) fluid interposed in between upper and lower substrates thereof in order to increase or decrease the rigidity of the screen against a contact surface of the touch panel. In the touch panel, the viscosity of electro-rheological fluid below the peripheral regions of a current input location (or a sensed latest input location) varies as the input location moves, which will be described later.

Figure 2:
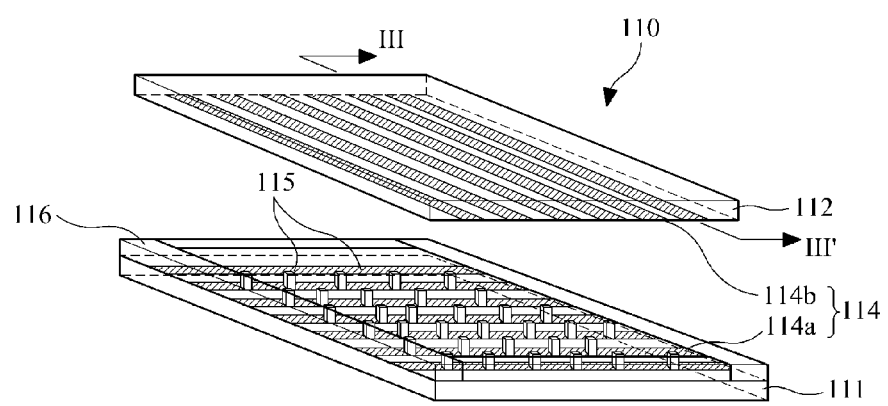
FIG. 2 is an exploded, perspective view showing a configuration of a touch panel body of the touch panel illustrated in FIG. 1.
Figure 3:
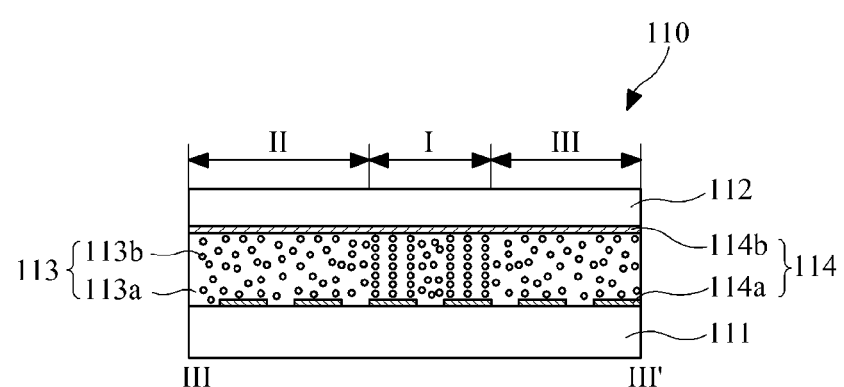
FIG. 3 is a cross-sectional view of the touch panel body cut along a III-III' line of FIG. 2.

FIG. 1 is a block diagram of an exemplary touch panel 100, FIG. 2 is an exploded, perspective view showing a configuration of a touch panel body 110 of the touch panel 100 illustrated in FIG. 1, and FIG. 3 is a cross-sectional view of the touch panel body 110 cut along a line III-III' of FIG. 2.

Referring to FIG. 1, the touch panel 100 includes a touch panel body 110, a sensing unit 120 and a controller 130. The touch panel body 110 is a physical structure included in the touch panel 100. The sensing unit 120 and controller 130 may be electrical circuits and/or a combination of hardware and software, or only software which sense any input to the touch panel body 110 to control driving of the touch panel body 110. Accordingly, the term "touch panel" used in this specification may indicate only the touch panel body 110 in a narrow sense, but also may indicate the entire touch panel 100 including all of the touch panel body 110, the sensing unit 120 and the controller 130 in a broad sense.

In FIG. 1, the sensing unit 120 and controller 130 are shown to be divided for logical classification according to their functions, however they may be integrated into a single unit or implemented as separate devices. The logical function classification between the sensing unit 120 and controller 130 is for convenience of description. In other words, a single integrated component may perform all functions of the sensing unit 120 and controller 130, or some functions of one (for example, the sensing unit 120) of the sensing unit 120 and controller 130 may be performed by the other one (for example, the controller 130). Hereinafter, a configuration of the touch panel body 110 will be described in detail with reference to FIGS. 2 and 3.

Referring to FIGS. 2 and 3, the touch panel body 110 includes a pair of substrates (that is, a lower substrate 111 and a upper substrate 112), electro-rheological fluid 113 that is filled and sealed in the gap between the lower substrate 111 and the upper substrate 112, and driving electrode arrays in which driving electrodes are arranged in pairs.

The lower substrate 111, which is a base substrate of the touch panel body 110, acts as one side of a container for filling the electro-rheological fluid 130 in the touch panel body 110. When the corresponding touch panel 100 (see FIG. 1) is implemented as a touch screen of an electronic device, the lower substrate 111 may be a display plane of the electronic device or a substrate attached additionally onto the display plane. The lower substrate 111 may be configured so as not to be deformed when a certain attraction force or repulsive force is applied between the lower substrate 111 and the upper substrate 112. That is, the lower substrate 111 may be made of a rigid or hard material. For example, the lower substrate 111 may be made of transparent glass. However, there are situations in which it is advantageous for the lower substrate 111 to be made of a material that not a hard material. For example, if the touch panel body 110 is attached on a hard display, the lower substrate 111 may be made of a transparent polymer film.

The upper surface of the upper substrate 112 is a user touch surface which a user contacts to input a signal. The upper substrate 112 may be deformed when predetermined force is applied thereto. For example, the upper substrate 112 may be deformed when a user contacts or presses the user touch surface with a finger, a stylus pen, etc. For such deformation, the upper substrate 112 may be made of a transparent, deformable polymer film or the like. The type of polymer usable for the upper substrate 112 is not limited. The upper substrate 112 is spaced a predetermined distance apart from the lower substrate 111 and accordingly a gap having a predetermined thickness is formed between the upper and lower substrates 112 and 111. The thickness of the gap may be set appropriately in consideration of a driving voltage, the width of the touch panel body 110, a cross-sectional area of each driving electrode pair 114, etc.

The electro-rheological fluid 113 is disposed in the gap between the lower and upper substrates 111 and 112. The electro-rheological fluid 113 may be sealed with sealant 116 may be applied along facing edge portions of one or both of the upper and lower substrates 112 and 111. The electro-rheological fluid 113 is a suspension in which fine particles 113b are dispersed in electro-insulative fluid 113a. The viscosity of the electro-rheological fluid 113 can change by a factor of about 100,000 as a maximum when an electric field is applied thereto, and since such variation in viscosity is reversible, the viscosity returns to its original level when the electronic field disappears.

The electro-rheological fluid 113 may be a transparent liquid such as, for example, silicon oil, kerosene mineral oil, olefin (PCBs), or the like. However, the electro-rheological fluid 113 may be any other material that possesses similar properties of low viscosity change with changing temperature, high flash point, low freezing point, etc. and for which the viscosity changes as a function of the electric field applied thereto. The particles 113b included in the electro-rheological fluid 113 may be very fine, transparent particles having a size of maximally about 50 μm. The particles 113b may be polymers, such as aluminosilicate, polyaniline, polypyrrole, or fullerene, or any other kind of insulative materials, such as ceramics or the like. Non-transparent ERF may also be used in some applications.

Also, spacers 115 may be provided in a dispersed manner in the gap between the upper and lower substrates 112 and 111. The spacers 115 are elastic elements made of small, transparent particles whose size is less than about several tens of micrometers and are randomly distributed in the electro-rheological fluid 113. The spacers 115 shown in FIG. 2 are exaggerated in size, and the arrangement of the spacers 115 shown as if they are dispersed at regular intervals is also exemplary for convenience of description, and in reality the spacers 115 are more likely to be randomly dispersed. Materials used to form the spacers 115 are not limited, and for example, the spacers 115 may be made of elastomer. The spacers 115 are used to provide the upper substrate 112 with restoring force and to support the upper substrate 112 structurally. That is, the spacers operate as elastic elements between the upper and lower substrate, and allow the substrates to recover to the original film shape in a very short time after a click operation, which will be described later. The spacers are advantageously spaced throughout the touch panel, but other types of distribution patterns may be used as long as the spacers may provide the restoring force and structural support. As discussed above, the distribution may also be random. For example, at the edges of the touch panel, the film tension is stronger than that of the center portion. Thus, it may be possible to use fewer spacers in the edge regions. That is, the spacer distribution may also vary depending on the location within the touch panel.

Figure 4:
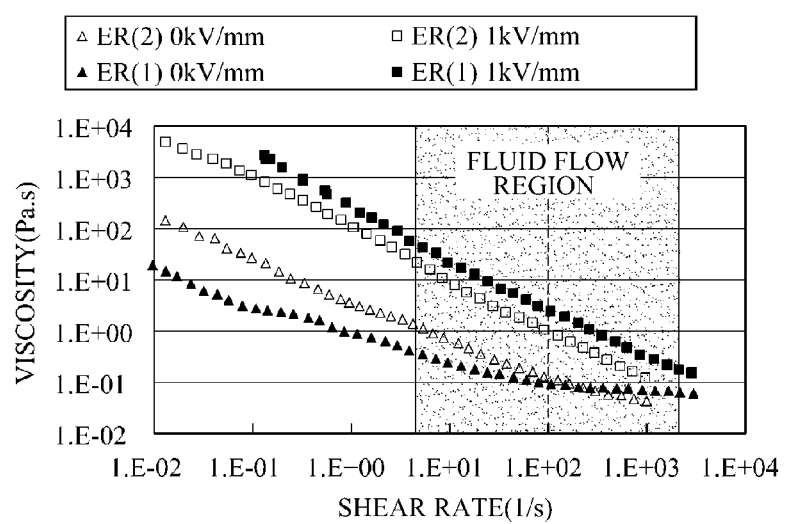
FIG. 4 is a graph showing a relationship between a driving voltage and viscosity of electro-rheological fluid.

FIG. 4 is a graph showing a relationship between a driving voltage to be applied to the driving electrode pairs 114 and viscosity of the electro-rheological fluid 113. A shear rate generated when the touch panel 100 is driven may be in the range of about 5 (1/s) to about 3000 (1/s). In FIG. 4, this range is denoted by "fluid flow region." FIG. 4 shows variations in viscosity of two kinds of electro-rheological fluids (one (ER (1)) is a widely commercialized electro-rheological fluid and the other (ER(2)) is a so-called "Pani-Clay 15%", however, these are only exemplary) when a driving voltage of 1 kV/mm is applied to the driving electrode pairs 114 (that is, when a driving voltage of 1 kV is applied to the driving electrode pairs 114, wherein in each electrode pair the driving electrodes are spaced a distance of 1 mm apart from each other), and when the driving voltage is no longer applied to the driving electrode pairs 114 (0 Kv/mm). It can be seen in FIG. 4 that application of driving voltage to the driving electrode pairs 114 increases the viscosity of the electro-rheological fluid 113 compared to when no driving voltage is applied thereto. Specifically, at a shear rate of 100 (1/s), a viscosity of the electro-rheological fluid 113 when applying a driving voltage is several tens or hundreds higher than that of the electro-rheological fluid 113 when applying no driving voltage for both fluids (ER(1)) and (ER(2)).

Also, it can be seen in FIG. 4 that applying a different level of a driving voltage to the driving electrode pairs 114 makes the viscosity of the electro-rheological fluid 113 vary. This is because the viscosity of the electro-rheological fluid 113 is proportional to the driving voltage. Furthermore, an increase in viscosity of the electro-rheological fluid 113 increases shear stress. Hence, a user may have, when contacting or pressing the electro-rheological fluid 113 with high viscosity, great repulsive force from the electro-rheological fluid 113. Due to this property of the touch panel 100, the user may be made to experience various tactile sensations when applying a pressing force to the touch panel 100.

Figure 10:
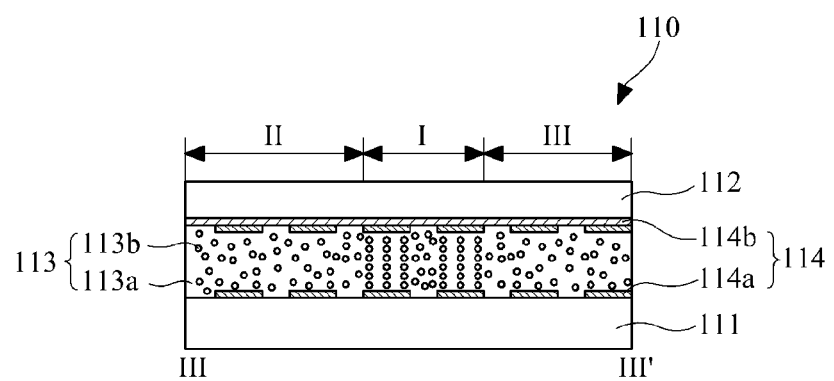
FIG. 10 is a cross-sectional view of the touch panel body showing another exemplary arrangement of top electrodes and bottom electrodes.

The driving electrode pairs 114 are arranged on the lower and upper substrates 111 and 112 such that driving electrodes disposed on the lower substrate 111 are paired with those disposed on the upper substrate 112. As illustrated in an area I of FIG. 3, when a bias voltage (that is, a driving voltage) is applied to predetermined driving electrode pairs 114, an electrical field is generated locally in the gap between the upper and lower substrates 112 and 111 where the driving electrode pairs 114 are positioned. As a result, in the I area, the viscosity of electro-rheological fluid 113 is increased. Meanwhile, in areas II of FIG. 3, since no bias voltage is applied to the corresponding driving electrode pairs 114, no electrical field is generated in the gap between the upper and lower substrates 112 and 111 where the driving electrode pairs 114 are positioned, and accordingly, in the II areas, the viscosity of electro-rheological fluid 113 does not vary. It is noted that FIG. 3 shows a single top electrode 114b and a plurality of bottom electrodes 114a when viewed from the side view (also see FIG. 2). However, this arrangement is only exemplary. It is also possible to provide an M×N array of electrodes on both the top and bottom, such that each individual pair of electrodes (top and bottom) is separately addressable and controllable (see FIG. 10).

The driving electrode pairs 114 may be arranged in the form of an array over the entire touch panel body 110 or arranged in the form of a matrix. In the case of arranging the driving electrode pairs 114 in the form of an array, a driving voltage may be applied to individual combinations of the driving electrode pairs 114 in order to supply the driving voltage only to selected driving electrode pairs. In addition, varying a combination of the driving electrode pairs 114 to which a driving voltage is to be applied or changing a driving voltage that is to be applied to the driving electrode pairs 114 may provide a user who conducts a continuous input with various tactile sensations, which will be described later.

FIG. 2 shows an example of driving electrodes that are arranged in the form of a matrix, wherein a plurality of lower electrode patterns 114a are arranged in parallel on the upper surface of the lower substrate 111 and a plurality of upper electrode patterns 114b are arranged in parallel on the lower surface of the upper substrate 112. The lower electrode patterns 114a extend in a first direction and the upper electrode patterns 114b extend in a second direction perpendicular to the first direction. Accordingly, at intersections of the lower and upper electrode patterns 114a and 114b, driving electrode pairs 114 are defined which are arranged in the form of an array throughout the entire area of the touch panel body 110. Unlike this, upper and lower electrodes that are each formed as a dot may be arranged in an array over the entire surface of the upper and lower substrates 112 and 111. In this case, the upper and lower driving electrodes may each be an active device allowing switching.

The driving voltage may be a power source which drives the touch panel 100 to vary the viscosity of the electro-rheological fluid 113. The driving voltage may be supplied from a power supply of an electronic device with the touch panel 100. The locations of driving electrode pairs 114 to which the driving voltage is to be applied and/or the level of the driving voltage are controlled by the controller 130 (see FIG. 1) of the touch panel 100. In the example illustrated in FIG. 3, a driving voltage is applied only to driving electrode pairs disposed in the I area whereas no driving voltage is applied to driving electrode pairs disposed in the II areas. A method of applying a driving voltage only to specific driving electrode pairs and adjusting a driving voltage that is to be applied to driving electrode pairs has little direct relation to the technical feature of the current embodiment and accordingly, detailed descriptions thereof will be omitted.

The touch panel 100 described above may be configured to generate input buttons on the user touch surface of the touch panel 100 and offer, when a user presses one of the input buttons without conducting a continuous input, the user with a clicking sensation similar to that felt when pressing a mechanical button. For example, by appropriately selecting areas (or combinations of driving electrode pairs 114) to which a driving voltage is to be applied and applying a driving voltage only to the selected areas, input buttons may be defined in a certain form on the user touch surface so that a user may recognize areas (that is, areas of driving electrode pairs to which a driving voltage is applied, like the I area of FIG. 3) with high viscosity of electro-rheological fluid 113 differently from areas (that is, areas of driving electrode pairs to which no driving voltage is applied, like the II areas of in FIG. 3) with low viscosity of electro-rheological fluid 113. The certain form may be predetermined. Thereafter, when a user's input to a certain input button is sensed, the applied driving voltage is released if a time period for which the user's input is maintained exceeds a threshold time, thereby providing the user with a clicking sensation. This method of defining input buttons and offering a clicking sensation has been described in detail in U.S. application Ser. No. 12/780,996, filed on May 17, 2009, by the present applicant, entitled "Touch Panel and Electronic Device Including the Same", and accordingly detailed descriptions therefore will be omitted herein. The disclosure of U.S. application Ser. No. 12/780, 996, filed on May 17, 2009, and titled "Touch Panel and Electronic Device Including the Same" is herein incorporated by reference in its entirety for all purposes with this specification.

Referring again to FIG. 1, the sensing unit 120 determines whether a user's input to the touch panel 100 occurs and calculates, when a user's input is sensed, an input location where the user's input occurs. A method in which the sensing unit 120 detects a user's input is not limited. For example, the sensing unit 120 may sense a user's input and the input location by detecting a change in capacitance at a certain location on a user touch surface of the upper substrate 112 (see FIG. 2), caused by the user's contact to the location. Information regarding the input location calculated by the sensing unit 120 is output to the controller 130.

The controller 130 operates to vary the viscosity of electro-rheological fluid 113 below at least one peripheral region of the input location perceived based on the input location information. However, the viscosity of electro-rheological fluid 113 below other regions than the peripheral region of the input location may also vary. For example, it is also possible to vary the viscosity of electro-rheological fluid 113 below all regions excluding the current input location.

The viscosity of electro-rheological fluid 113 may vary depending on the intensity of an electric field applied thereto (see FIG. 4). The controller 130 may vary the viscosity of electro-rheological fluid 130 by controlling a driving voltage to be applied to various driving electrode pairs 114. The controller 130 may select locations (for example, the area I of FIG. 3) corresponding to driving electrode pairs to which a driving voltage is to be applied, to control the locations at which the viscosity of the electro-rheological fluid 113 will be varied. The driving voltage may be controlled based on absolute criteria or controlled relative to the previously applied driving voltage.

The touch panel 100 may provide various tactile sensations to a user who conducts a continuous input such as sliding or tracing motion against the user touch surface. For this, the controller 130 may determine whether a current input is a continuous input based on input locations calculated by the sensing unit 120. For example, when input coordinates sensed by the sensing unit 120 continue to vary over time, the controller 130 may consider the corresponding input as a continuous input. The time may be a predetermined time. However, the current embodiment is not limited to this example. For example, it is also possible that the sensing unit 120 determines whether an input from a user is a continuous input, and transfers, when determining that the input is a continuous input, the result of the determination result to the controller 130 along with information regarding input locations.

A continuous input is an input whose input location continues to vary over a certain time period, and the traveling path of a continuous input or the type of an instruction that will be executed by such a continuous input is not limited. For example, the traveling path of a continuous input may be in a horizontal direction, in a vertical direction, in a diagonal direction, in a zigzag direction, in an out and back manner, etc. Also, when an input operation such as a "pinch" operation using two fingers at once is conducted or when an input operation is combined with another operation such as a "tapping" operation, the input operation may be considered as a continuous input if the input location varies over time. Also, other than the case in which a continuous input is recognized as a predetermined instruction through a predetermined gesture, there is the case where a continuous input is recognized as a predetermined instruction in association with a displayed screen. For example, dragging & dropping one (for example, a file) of displayed objects, moving a scroll bar up and down and/or left and right, moving a playing time adjusting bar or a volume adjusting bar up and down and/or left and right, etc. may be examples of continuous inputs.

When it is determined that a continuous input occurs, the controller 130 controls the viscosity of the electro-rheological fluid 113. In more detail, the controller 130 operates to locally vary the viscosity of electro-rheological fluid below peripheral regions of a current input location, that is, the latest input location among input locations at which the continuous input occurs. The "peripheral regions of the latest input location" need not be limited to peripheral regions in a predicted traveling direction (for example, a direction in which the continuous input has headed to reach the latest input location) of the continuous input. This is because the traveling path of a continuous input may arbitrarily be varied by a user.

Figure 5A:
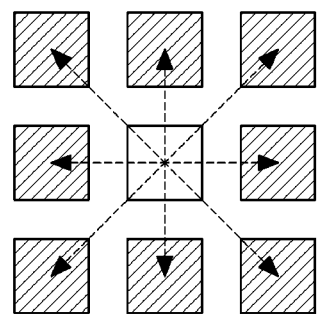
FIG. 5A is an example showing a latest input location and its peripheral regions.
Figure 5B:
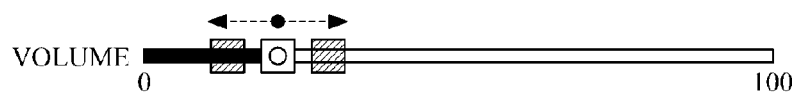
FIG. 5B is another example showing a latest input location and its peripheral regions.

Accordingly, the "peripheral regions of the latest input location" may be regions adjacent in all directions to the latest input location, as illustrated in FIG. 5. When the path of a continuous input is limited to a certain straight line section, for example, in association with a display screen, like a scroll bar, a playing time adjusting bar or a volume adjusting bar, as illustrated in FIG. 5B, the "peripheral regions of the latest input location" may be regions adjacent in the front and back directions to the latest input location. That is, the "peripheral regions of the latest input location" may be regions adjacent to the current input position along the scroll bar, the playing time adjusting bar, the volume adjusting bar, etc. For example, in FIG. 5B, the regions adjacent to the box having the circle therein are varied in the horizontal direction in the figure. In order to locally vary the viscosity of electro-rheological fluid 113 below the peripheral regions of the latest input location, the controller 130 may control the locations of driving electrode pairs to which a driving voltage is to be applied among the arrays of driving electrode pairs or may control a driving voltage that is to be applied to the corresponding driving electrode pairs, which has been described above.

If a driving voltage with a different level from a driving voltage being applied to the latest or current input location is applied to driving electrode pairs corresponding to the peripheral regions of the latest or current input location, the user who conducts the continuous input may have a different tactile sensation (for example, a different strength of repulsive force) over time. For this, a driving voltage with a level that is comparable to the driving voltage being applied to the latest input location may be applied to the peripheral regions of the latest input location. In this case, the driving voltage may be applied only during a time period for which the input from the user is determined to be a continuous input or only during a time period for which the input location continues to vary. During a time period in which the continuous input is maintained, the driving voltage with the level comparable to the driving voltage being applied to the latest input location is continually applied to the peripheral regions of the latest input location.

FIGS. 6A through 6D are graphs showing exemplary driving voltage patterns that are to be applied to the peripheral regions of the latest input location. In FIGS. 6A through 6D, the vertical axis represents a level of a driving voltage that is applied to the peripheral regions of the latest input location with respect to a traveling distance of a continuous input. As the viscosity of electro-rheological fluid is proportional to a driving voltage, an increase or decrease of a driving voltage increases or decreases the viscosity of electro-rheological fluid. Also, the increase or decrease in viscosity of electro-rheological fluid increases or decrease a rigid sensation that a user can feel. Since the input location of a continuous input varies over time, the locations of the peripheral regions also vary over time. That is, as a current input location moves, the peripheral regions of the current input location also move along the traveling path of the continuous input.

Figure 6A:
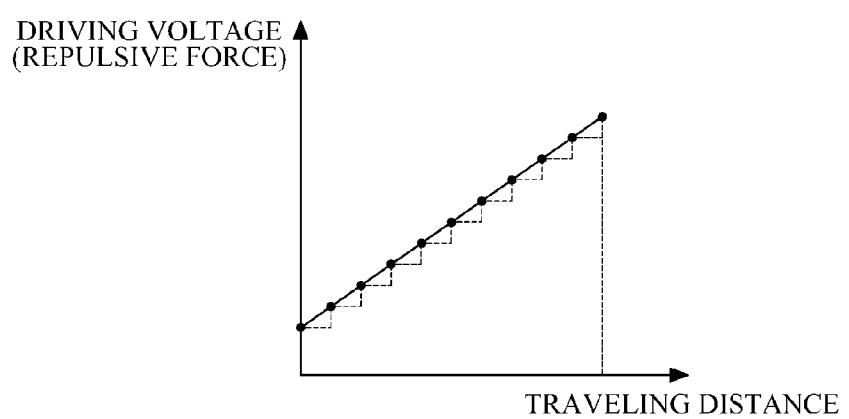
FIGS. 6A through 6D are graphs showing exemplary driving voltage patterns to be applied to the peripheral regions of the latest input location.

According to the driving voltage pattern illustrated in FIG. 6A, a driving voltage increases in proportion to the traveling distance of a continuous input. The driving voltage may increase linearly (as denoted by a straight line) or may increase stepwise (as denoted by a stepped dotted line). The level of a driving voltage to be initially applied and the slope of the increasing driving voltage are not limited. The slope of the increasing driving voltage does not need to be constant and may vary depending on the traveling distance of the continuous input or the content of a display screen (for example, existence of objects, window borders, etc.). An increase in the driving voltage increases the viscosity of electro-rheological fluid below the peripheral regions of the current input location and accordingly a rigid sensation that a user can feel also increases.

Figure 6B:
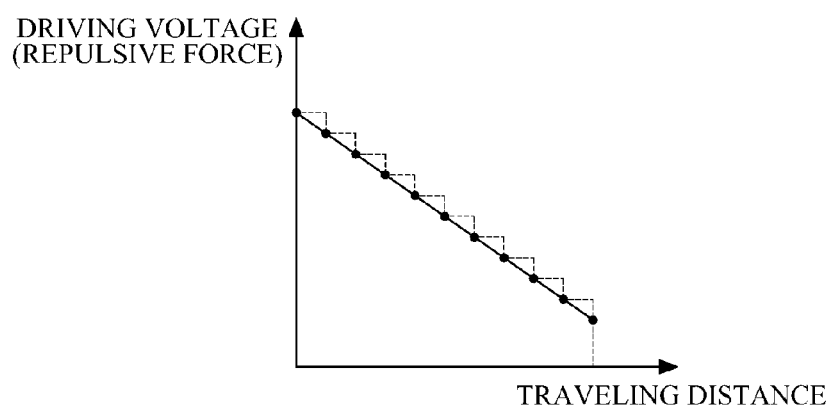

Referring to FIG. 6B, a driving voltage decreases as the traveling distance of a continuous input increases. Here, the driving voltage may decrease linearly (a straight line) or stepwise (a dotted line). Likewise, the level of a driving voltage to be initially applied and the slope of the decreasing driving voltage are not limited. Also, the slope of the increasing driving voltage does not need to be constant and may vary depending on the traveling distance of the continuous input or the content of a display screen (for example, existence of objects, window borders, etc.). Since the increase or decrease of the driving voltage increases or decreases the viscosity of electro-rheological fluid below the peripheral regions of the current input location, a user may experience great or small repulsive force correspondingly.

Figure 6C:
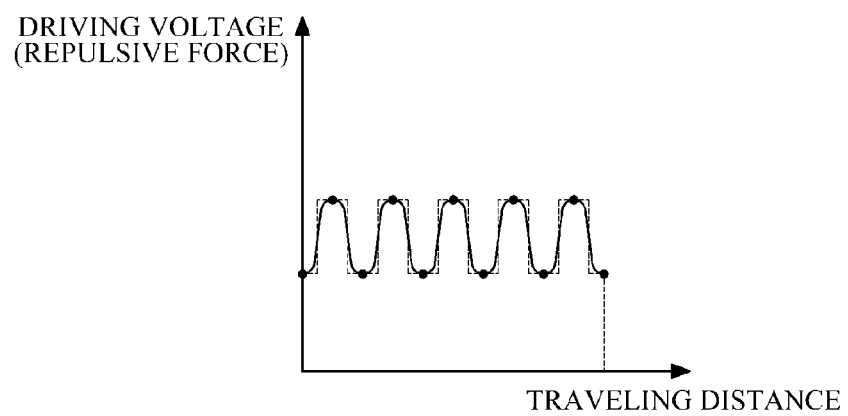

Referring to FIG. 6C, a driving voltage rises and falls alternately along with a traveling distance of a continuous input. Here, the driving voltage may rise and fall continuously like a sine wave or discontinuously like a pulse wave. The amplitude or period of such a sine wave or pulse wave may be constant regardless of or vary depending on the traveling distance of the continuous input. The alternate rising and falling of the driving voltage alternately increases and decreases the viscosity of electro-rheological fluid below the peripheral regions of a current input location, so that a user may experience alternately great and small repulsive force correspondingly.

Figure 6D:
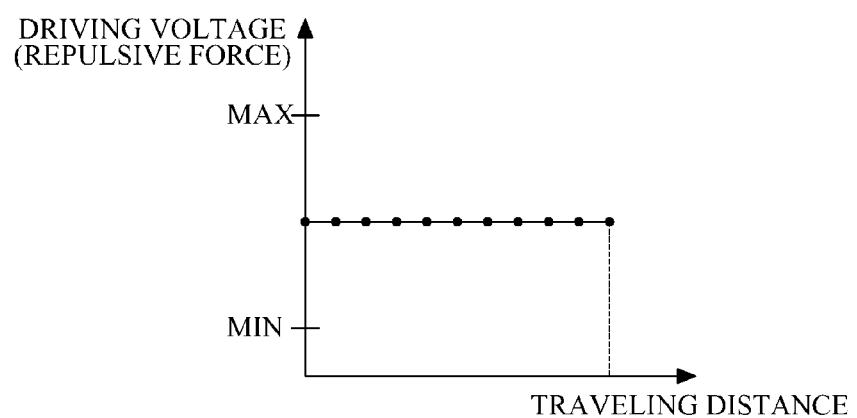

Referring to FIG. 6D, a driving voltage is maintained constant regardless of a traveling distance of a continuous input. The driving voltage may be set as a minimum voltage (MIN) or a maximum voltage (MAX) at which a touch panel can operate normally, or as an arbitrary voltage between the minimum driving voltage (MIN) and the maximum driving voltage (MAX). As such, in the case of maintaining a driving voltage constant, the viscosity of electro-rheological fluid is also maintained constant, so that a user may experience constant repulsive force while conducting the continuous input.

The driving voltage patterns shown in FIGS. 6A through 6D may be individually applied for a continuous input, or two or more of the driving voltage patterns may be combined and applied for a continuous input. The magnitude, increasing or decreasing slope, period and/or amplitude of each driving voltage pattern may vary. Also, a driving voltage pattern may be pre-set for an electronic device with a touch panel or set arbitrarily by a user who conducts a predetermined continuous input. In the latter case, it will be apparent to those skilled in the art that a driving voltage pattern may be selected depending on the type of a continuous input and/or a kind of an instruction that is to be executed by a continuous input.

By utilizing the touch panel 100 described above, various tactile sensations or repulsive force variations according to the types of continuous inputs may be provided to users. Particularly, if the touch panel 100 is implemented as a touch screen, various tactile sensations may be provided to a user in consideration of kinds of objects displayed on a display of the touch screen, the existence or absence of window borders, or the kinds of instructions that are to be executed through continuous inputs, etc. Through such various tactile sensations, the user may recognize whether continuous input is being conducted correctly only by tactile sensation without having to view a displayed screen. Hereinafter, an example of offering various tactile sensations in regard to the types of continuous inputs will be described in detail.

Figure 7A:
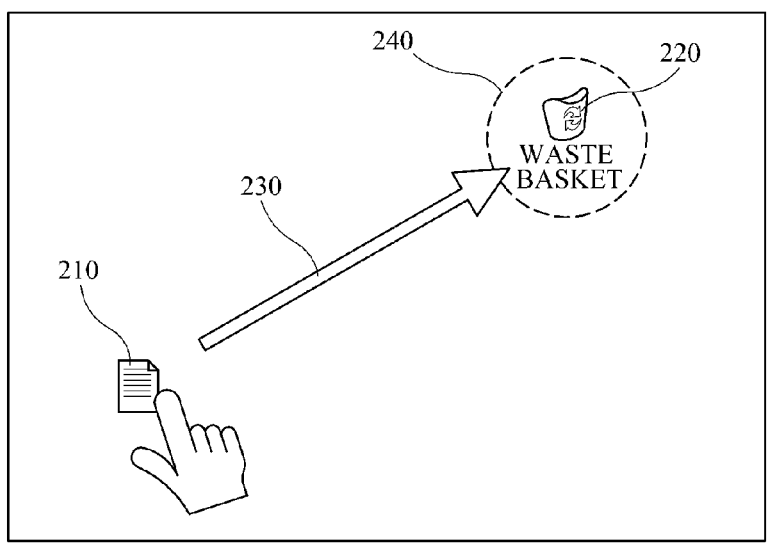
FIG. 7A illustrates an exemplary continuous input to drag & drop a certain object.
Figure 7B:
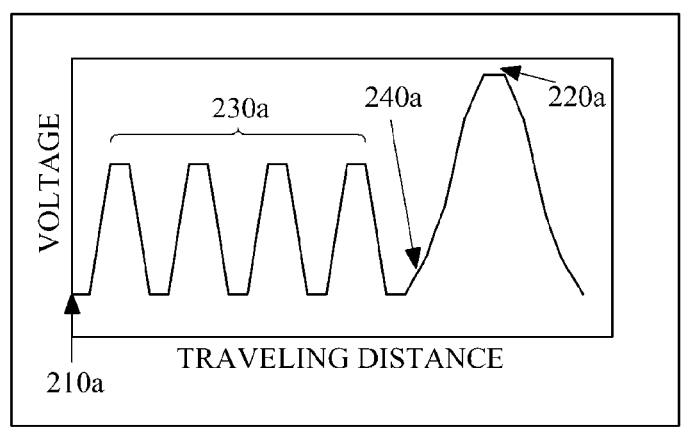
FIG. 7B shows an exemplary driving voltage pattern that is applied when the continuous input illustrated in FIG. 7A is conducted.

FIG. 7A illustrates an exemplary continuous input to drag and drop a specific object, and FIG. 7B shows an exemplary driving voltage pattern that is applied when the continuous input illustrated in FIG. 7A is conducted. Referring to FIG. 7A, a user inputs an instruction for dragging and dropping an icon (for example, a certain file) displayed on a screen from its initial location 210 to a target location 220. Referring to FIG. 7B, while the user drags the icon (230), a driving voltage that is applied to the peripheral regions of a current input location (that is, the latest input location) is in a pulse wave form. When a driving voltage is applied in a pulse wave form, the viscosity of electro-rheological fluid below the peripheral regions alternately increases and decreases along with the movement of the current input location. As a result, the user who slides a user touch surface of the screen with his or her finger may experience an alternate increase and decrease in rigidity of the screen.

Applying a driving voltage in the pulse wave form may be repeated until the icon 210 reaches the target location 220. Alternatively, as illustrated in FIGS. 7A and 7B, it is also possible that the driving voltage is applied in the form of alternately increasing and decreasing pulses until the icon 210 reaches a first location 240 near the target location 220, and after the first location 240, the driving voltage continues to increase gradually. When the driving voltage continues to increase, the user may feel a continuous increase in rigidity of the screen after the first location 240 and thus recognize with his or her tactile sensation that the current input location is approaching the target location 220. Upon a drop operation after the current input location reaches the target location 220, a highest driving voltage may be applied to inform the user of completion of all inputs (drag & drop).

Figure 8A:
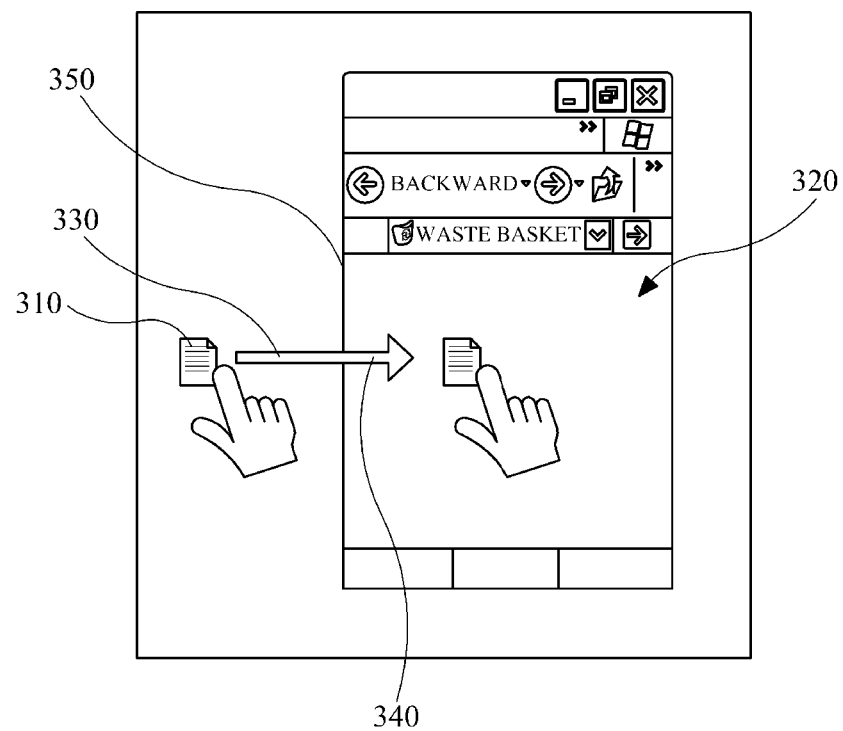
FIG. 8A illustrates another exemplary continuous input to drag & drop a certain object while crossing a window border.
Figure 8B:
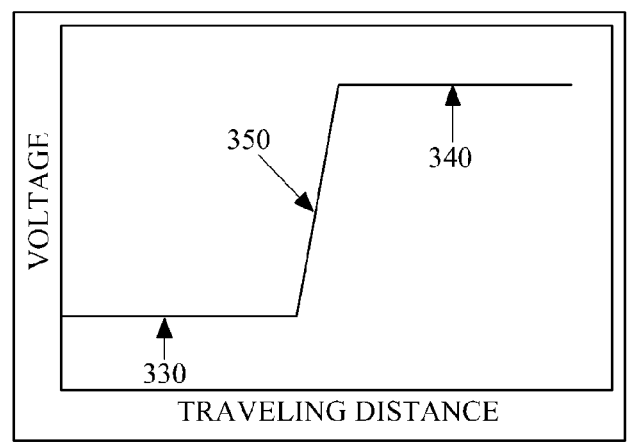
FIG. 8B shows an exemplary driving voltage pattern that is applied when the continuous input illustrated in FIG. 8A is conducted.

FIG. 8A illustrates another exemplary continuous input to drag & drop a certain object while crossing a window border, and FIG. 8B shows an exemplary driving voltage pattern that is applied when the continuous input illustrated in FIG. 8A is conducted. Referring to FIG. 8A, a user inputs an instruction for dragging and dropping an icon (for example, a certain file) displayed on a screen from its initial location 310 to a target location 320 which is in a window screen, while crossing a window border 350. Then, referring to FIG. 8B, while the user drags the icon 310 along a line 330 before crossing the window border 350, no driving voltage or a low level of a driving voltage is applied to the peripheral regions of a current input location (the latest input location). Then, while the icon crosses the window border 350 and after the icon has crossed the window border 350 into the target location 320, a relatively high level of driving voltage 340 is applied to the peripheral regions of the current input location. In this case, the user may feel little repulsive force or very small repulsive force against the screen when beginning to conduct a continuous input, and thereafter feel very great repulsive force against the screen after the item 310 has crossed the window border 350. Accordingly, due to the difference in repulsive force, the user may recognize whether or not the current input location crosses the window border 350 with his or her tactile sensation. The stepped variation in driving voltage shown in FIG. 8B is only exemplary, and a different driving voltage pattern (for example, a pulse wave, a sine wave, etc.) may be applied for the continuous input. Moreover, an inverse voltage pattern to that shown in FIG. 8B may be applied such that a user experiences the icon 310 "falling into" the target area 320.

Figure 9A:
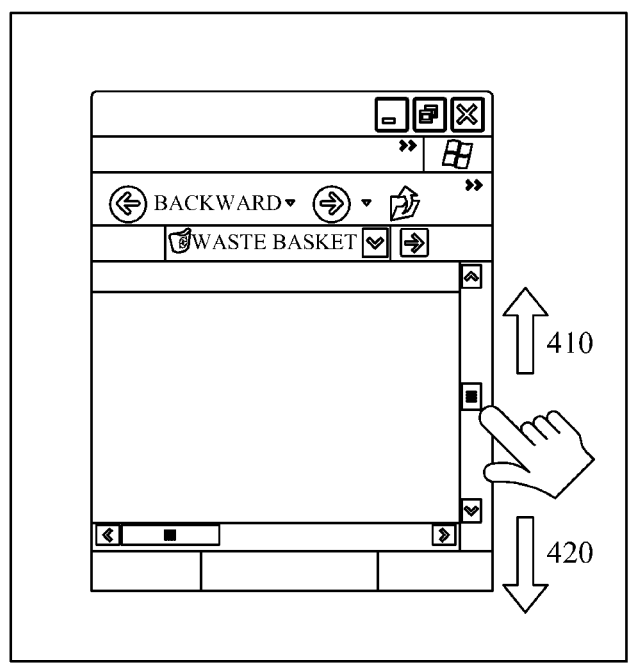
FIG. 9A illustrates another exemplary continuous input to move a scroll bar.
Figure 9B:
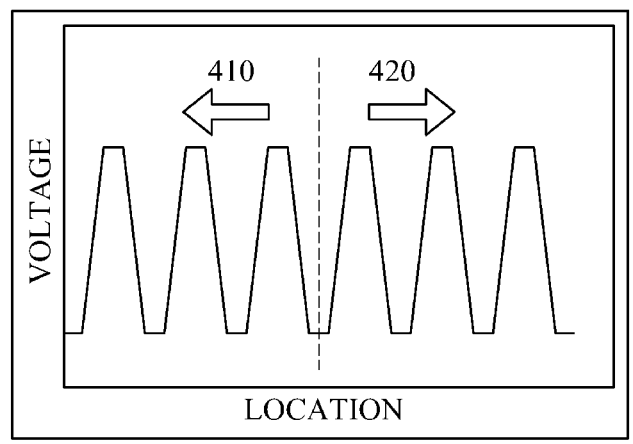
FIGS. 9B and 9C shows exemplary driving voltage patterns that are applied when the continuous input illustrated in FIG. 9A is conducted.
Figure 9C:
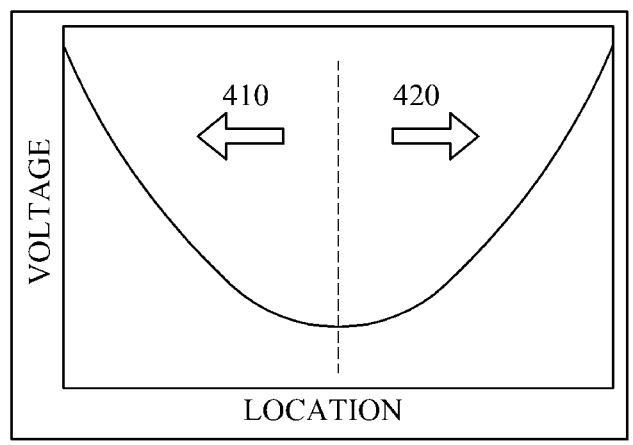

FIG. 9A shows another example of a continuous input, and FIGS. 9B and 9C show exemplary driving voltage patterns that are applied when the continuous input illustrated in FIG. 9A is conducted. Referring to FIG. 9B, a driving voltage which is applied to peripheral regions of a current input location (the latest input location) while a user moves a scroll bar up and down is in a pulse wave form, wherein the amplitude of the driving voltage may be pre-set based on the locations of the scroll bar. When a driving voltage is applied in a pulse wave form, the viscosity of electro-rheological fluid below the peripheral regions of a current input location alternately increases and decreases along with the movement of the current input location. As a result, repulsive force against the user's finger that slides along the scroll bar increases and decreases accordingly, so that the user may have a tactile sensation similar to that felt when rolling a scroll wheel of a mouse. In this case, since the user can recognize a traveling distance of the continuous input according to the number of sensed pulses, it is possible to adjust scrolling of the scroll bar precisely only by the tactile sensation.

Referring to FIG. 9C, while the user moves the scroll bar up or down, a driving voltage that is applied to the peripheral regions of the current input location (the latest input location) continues to increase, wherein the amplitude of the driving voltage may be pre-set based on a start position of the scroll bar. For example, as illustrated in FIG. 9C, the further the current input location moves from the start position of the scroll bar, the higher driving voltage is applied. In this case, when moving the scroll bar to a location close to the start position, the user may feel a small repulsive force against the screen and experience a low-speed scrolling, and when moving the scroll bar far away from the start position, a large repulsive force may be felt against the screen creating an experience of a fast-speed scrolling. Accordingly, it is possible to adjust a scroll speed only by use of tactile sensation.

By applying or modifying the embodiments described above, various effects may be obtained using the touch panel 100. While only a few examples of various patterns have been discussed above, one of ordinary skill in the art will understand that by using various presentations on the screen and manipulating the driving voltages accordingly, virtually any pattern may be realized. As described above, the touch panel 100 provides a user with various tactile sensations upon conducting a continuous input so that the user can intuitively recognize a timing for terminating the continuous input and also is prevented from conducting any wrong inputs. Furthermore, when scrolling in a region of the touch panel 100, a user may have a tactile sensation similar to that felt when rolling a scroll wheel of a mouse to be able to recognize an exact scrolled location and adjust scrolling accurately. In addition, in the case where a user conducts a specific continuous input (for example, sliding a finger on a user contact surface) to turn pages displayed on an e-book terminal, etc., the touch panel 100 may adjust repulsive force to provide the user with resistance similar to that felt when turning real pages.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

By utilizing touch panels according to the above-described embodiments, it is possible to offer a sense of input or a tactile sensation to a user who conducts a continuous input. In addition, a user who conducts a continuous input on the touch panel may be prevented from conducting wrong inputs because the user can recognize a location at which the continuous input has to be terminated, or the existence of any objects or any window border on a traveling path of the continuous input through tactile sensation.

What is claimed is:

1. A touch panel comprising:
a first substrate;
a second substrate that is spaced apart from the first substrate by a gap, the second substrate comprising a touch surface;
an electro-rheological fluid that is filled in a gap between the first substrate and the second substrate;
a sensor that senses an input on the touch surface and determines an input location at which the input occurs; and
a controller that varies a viscosity of the electro-rheological fluid in a location corresponding to a peripheral region of the input location in relation to a viscosity of the electro-rheological fluid in a location corresponding to the input location, and
wherein the controller determines whether the input is a continuous input based on the input location, and, when the input is determined to be a continuous input, varies the viscosity of electro-rheological fluid in a location corresponding to a peripheral region of a latest input location among input locations determined by the sensing unit.

2. The touch panel of claim 1, wherein the controller varies the viscosity of the electro-rheological fluid in a location corresponding to the peripheral region of the input location, according to at least one method selected from among a first method of increasing the viscosity of the electro-rheological fluid along a traveling path of the continuous input, a second method of decreasing the viscosity of the electro-rheological fluid along the traveling path of the continuous input, a third method of maintaining the viscosity of the electro-rheological fluid constant regardless of the traveling path of the continuous input, and a fourth method of alternately increasing and decreasing the viscosity of the electro-rheological fluid along the traveling path of the continuous input.

3. The touch panel of claim 2, wherein the controller varies the viscosity of the electro-rheological fluid in the location corresponding to the peripheral region of the latest input location with respect to viscosity of electro-rheological fluid in the location corresponding to the latest input location.

4. The touch panel of claim 2, wherein the at least one method which the controller uses to vary the viscosity of the electro-rheological fluid are selected by a user.

5. The touch panel of claim 1, further comprising a plurality of driving electrode arrays in which driving electrodes are arranged on the first substrate and the second substrate such that the driving electrodes form driving electrode pairs, each of the driving electrode pairs including a driving electrode on the first substrate and a corresponding driving electrode on the second substrate,
wherein the controller controls locations at which a driving voltage is to be applied through a corresponding driving electrode pair, and an amplitude of the driving voltage that is to be applied to the driving electrode pairs.

6. A touch panel comprising:
a first substrate;
a second substrate that is spaced a apart from the first substrate by a gap, the second substrate comprising a touch surface;
a plurality of driving electrode arrays in which driving electrodes are arranged on the first substrate and the second substrate such that the driving electrodes form driving electrode pairs, each of the driving electrode pairs including a driving electrode on the first substrate and a corresponding driving electrode on the second substrate and each of the driving electrode pairs is configured to induce an electrical field locally between the first substrate and the second substrate upon application of a driving voltage;
an electro-rheological fluid that is filled in the gap between the first substrate and the second substrate, wherein a viscosity of the electro-rheological fluid is changed by an electrical field induced by the driving electrode pairs; and
a controller that, when a continuous input from a user is sensed on the touch surface, varies a viscosity of the electro-rheological fluid by applying a different driving voltage pattern to driving electrode pairs in a location corresponding to at least one peripheral region of a latest input location among locations at which the continuous input is sensed, with respect to a driving voltage pattern applied to driving electrode pairs in a location corresponding to the latest input location.

7. The touch panel of claim 6, wherein the driving voltage pattern is at least one pattern that is selected from among a first pattern where the driving voltage increases along a traveling path of the continuous input, a second pattern where the driving voltage decreases along the traveling path of the continuous input, a third pattern where the driving voltage is maintained constant regardless of the traveling path of the continuous input, and a fourth pattern where the driving voltage alternately increases and decreases along the traveling path of the continuous input.

8. The touch panel of claim 7, wherein the controller increases or decreases the driving voltage by varying an amplitude of the driving voltage to be applied to the driving electrode pairs in the location corresponding to the peripheral region of the latest input location.

9. The touch panel of claim 7, wherein the driving voltage pattern is selectable by the user.

10. The touch panel of claim 7, wherein the fourth pattern is configured to vary the driving voltage to increase and decrease according to a sine wave form or to a pulse wave form along the traveling path of the continuous input.

11. The touch panel of claim 10, wherein at least one of an amplitude and frequency of the sine wave or the pulse wave is variable.

12. The touch panel of claim 6, wherein the touch panel is incorporated into a display of an electronic device as a touch screen, and
the controller controls an amplitude of the driving voltage applied to the driving electrode pairs at the location corresponding to the peripheral region of the latest input location based on a distance from the latest input location to an object displayed on the touch screen, the object being located on the touch screen a distance away from the latest input location.

13. The touch panel of claim 12, wherein, as the distance between the object and the latest input location decreases, the controller controls the amplitude of the driving voltage to increase, reaching a maximum amplitude just before the latest input location reaches the object.

14. The touch panel of claim 6, wherein the touch panel is incorporated into a display of an electronic device as a touch screen, and
the controller controls an amplitude of the driving voltage applied to the driving electrode pairs at the location corresponding to the peripheral region based on a distance from the latest input location to a window border displayed on the touch screen, the window border being located on the touch screen a distance away from the latest input location.

15. The touch panel of claim 14, wherein, as the distance between the window border and the latest input location decreases, the controller controls the amplitude of the driving voltage to increase or decrease, reaching a maximum or a minimum, respectively, just before the latest input location reaches the window border.

16. The touch panel of claim 6, wherein the touch panel is incorporated into a display of an electronic device as a touch screen, wherein a scroll bar is displayed on the touch screen and the continuous input is to move the scroll bar.

17. The touch panel of claim 16, wherein the driving voltage applied to the driving electrode pairs has a pulse wave form, and the controller controls an amplitude of the driving voltage based on a range within which the scroll bar is movable on the touch screen.

18. An electronic device having the touch panel of claim 1 as a user input interface.

19. An electronic device having the touch panel of claim 6 as a user input interface.

* * * * *